(No Model.) 3 Sheets—Sheet 2.
M. F. BROWN.
FLOUR BIN AND SPICE RECEPTACLE.
No. 591,124. Patented Oct. 5, 1897.
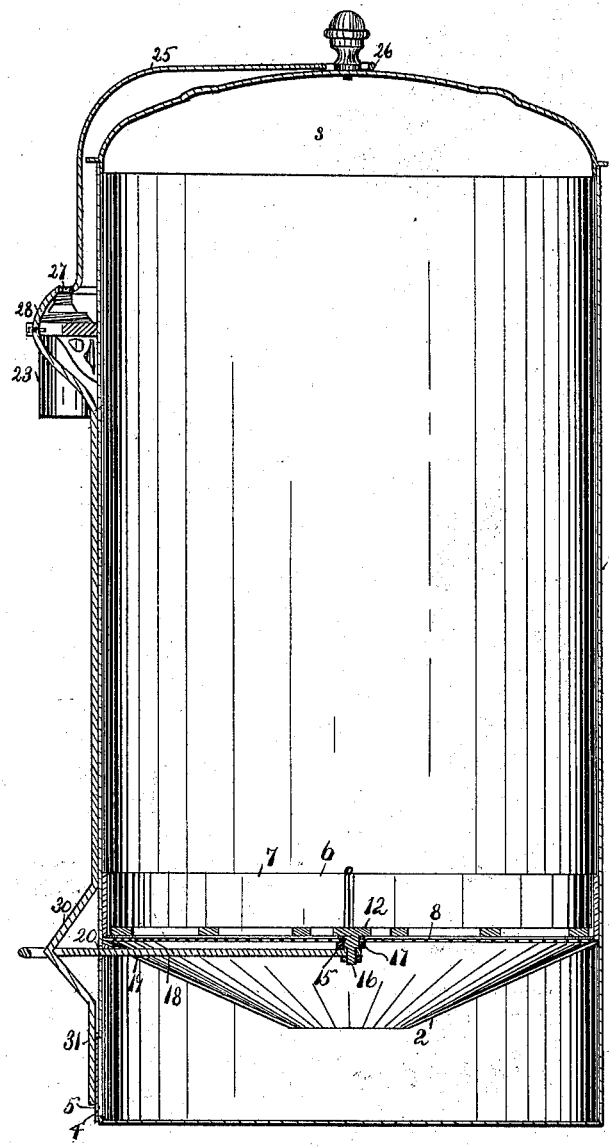
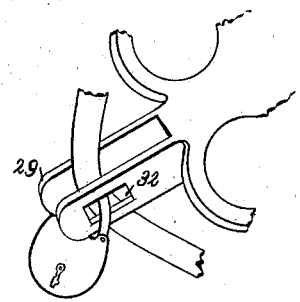
Fig.4.
Fig.3.
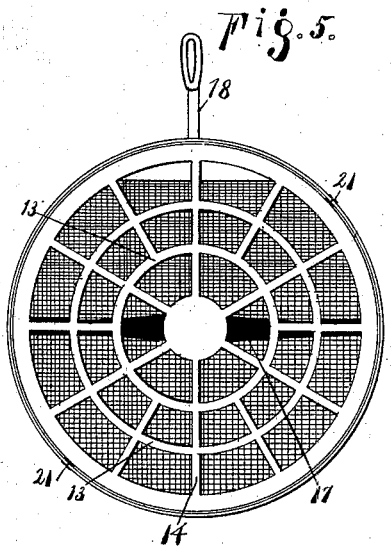
Fig.5.
Witnesses
Inventor
By Attorney (No Model.) 3 Sheets—Sheet 3.
M. F. BROWN.
FLOUR BIN AND SPICE RECEPTACLE.
No. 591,124. Patented Oct. 5, 1897.
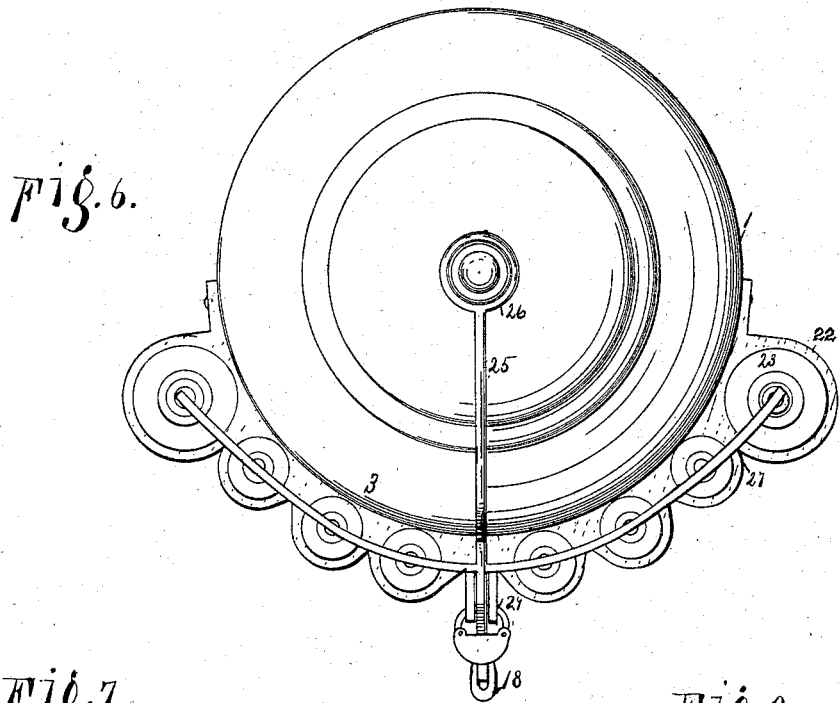
Fig. 6.
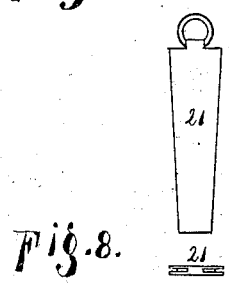
Fig. 7.
Fig. 8.
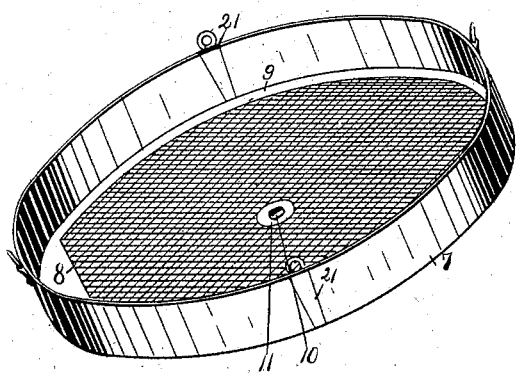
Fig. 9.
Witnesses Inventor
Ernest K. Wood Millard F. Brown,
Rosa Leathers By Attorney

UNITED STATES PATENT OFFICE.

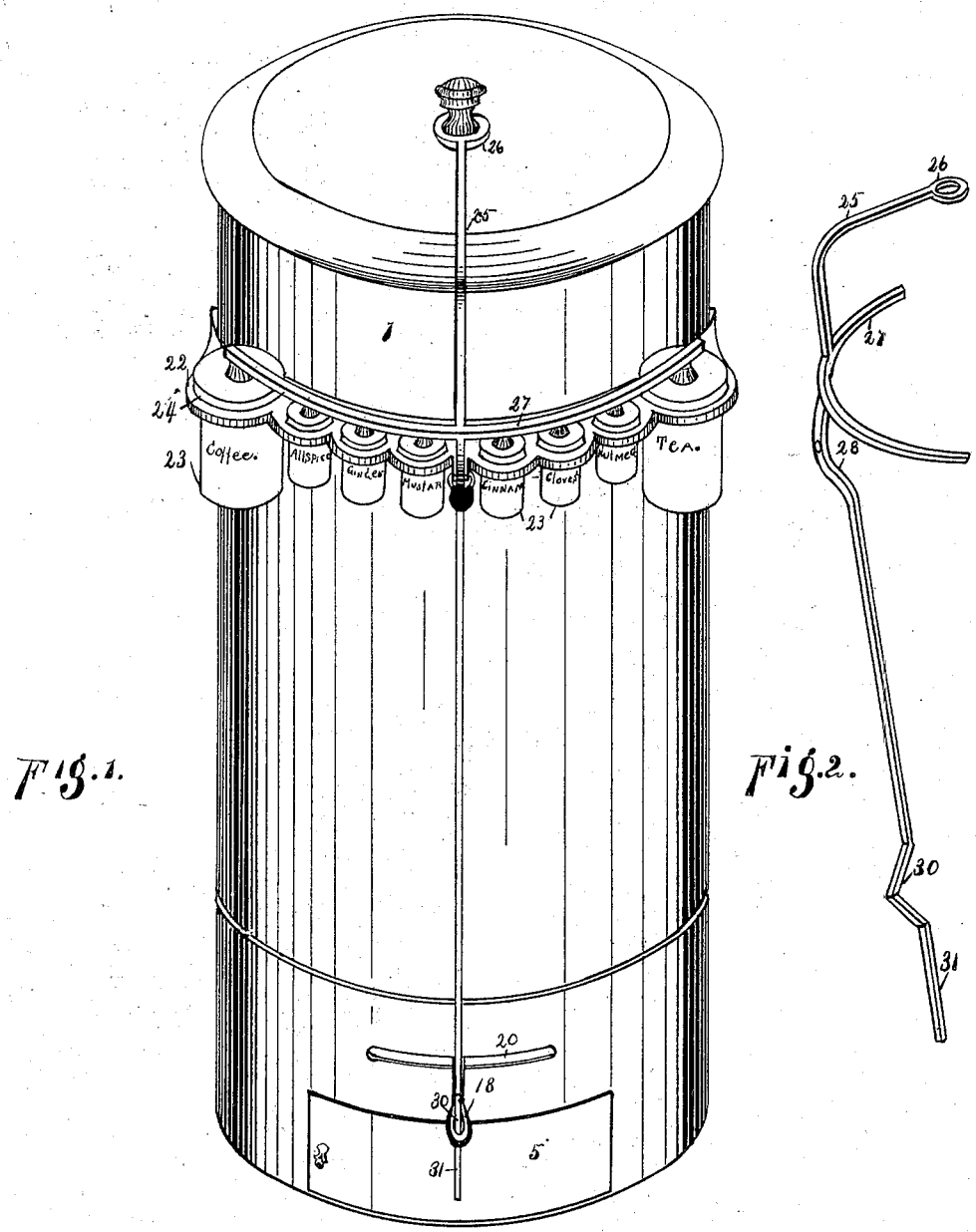

MILLARD F. BROWN, OF KANSAS CITY, MISSOURI.

FLOUR-BIN AND SPICE-RECEPTACLE.

SPECIFICATION forming part of Letters Patent No. 591,124, dated October 5, 1897.

Application filed October 5, 1896. Serial No. 607,837. (No model.)

*To all whom it may concern:*

Be it known that I, MILLARD F. BROWN, a citizen of the United States of America, residing at Kansas City, in the county of Jackson and State of Missouri, have invented certain new and useful Improvements in Kitchen-Cabinets and Flour-Sifters, of which the following is a specification.

The object of my invention is to provide an improved flour bin and sifter compact, efficient, and inexpensive, to combine therewith receptacles for tea, coffee, spice, or other articles of frequent use in the kitchen, and to provide a common lock for the several receptacles or compartments, so that none of the compartments can be opened or removed without removing the lock.

My invention consists in the combination and arrangement of parts hereinafter described and claimed.

In the drawings, Figure 1 is a perspective view of my device; Fig. 2, a perspective view of the locking-bar; Fig. 3, a central vertical section of my device; Fig. 4, a perspective view of the lock projections; Fig. 5, a plan of the sifter; Fig. 6, a plan of my device; Fig. 7, an elevation of a sieve-key; Fig. 8, an end view of the same, and Fig. 9 a perspective view of the sieve.

The numeral 1 represents a receptacle, preferably in cylindrical form and provided on the inner side near the lower end thereof with a deflector 2 in the form of a frustum of an inverted hollow cone, adapted to direct meal or flour to the center of the base of the receptacle. The upper end of the receptacle is capped with a removable lid or cover 3.

The numeral 4 represents an opening in the wall of the receptacle 1 below the deflector 2, ordinarily closed by a swinging door 5.

Mounted within receptacle 1 above deflector 2 is a removable sieve 6, approximately of the same perimeter as the inner side of receptacle 1 and consisting of an annular flange or guide-rim 7 and a screen-bottom 8. The upper side of the screen-bottom is bound or faced adjacent the annular part 7 by a narrow imperforate strip 9 and around a central opening 10 by an annular imperforate plate 11, both of thin material and adapted to hold an agitator 12 just above the screen-cloth. The agitator 12 preferably consists of several concentric circular plates 13, connected by arms 14, radiating from a central hub 15. Depending from the under side of hub 15 is a screw-threaded stem 16, passing through the central opening 10 in the screen-bottom and through an opening in a cross-bar 17, secured to the inner side of the receptacle and extending diametrically across the same. The lower end of the stem is adapted to receive an agitator-handle 18, extending through a slot 20 in the side of the receptacle and through a slot 19 in the deflector.

By oscillating the handle 18 the agitator 12 is oscillated within the sieve, and any material resting on the screen-bottom will be worked therethrough and will fall upon the conical deflector and thence to the central part of the bottom of the receptacle. The imperforate strip 9 is widened above the slot 19 to prevent sifted material falling therethrough.

The sieve and agitator are made removable from the receptacle to facilitate cleaning the same. To enable the easy removal of the sieve and yet have it fit the receptacle tightly when necessary, I provide the annular rim or guide 7 of the sieve with narrow perpendicular V-shaped grooves, which allow the upper part of the rim to be slightly contracted, so as to be of a diameter less than the inner diameter of the receptacle 1. To expand the rim so as to fit the receptacle, I provide flanged wedges 21, adapted to slip into the V-shaped grooves.

Secured to the outside of receptacle 1 is a bracket 22, provided with a series of openings adapted to receive a series of receptacles 23 for spices, &c. The receptacles 23 are preferably provided with caps having shoulders 24, which rest upon the upper side of the bracket. The end receptacles are preferably larger than the intermediate ones for the reception of other valuable articles of greater bulk than the spices.

It is often desirable to lock the minor receptacles of a portable kitchen-cabinet to the major one to prevent their removal and at the same time to lock the individual compartments to prevent removal of their contents. For this purpose I provide a lock-bar 24, having an upper curved end 25, provided with a ring 26, adapted to take over the knob or button on the lid 3; a curved portion 27, extending in a plane at right angles to the main portion and adapted to take over the lids of the minor receptacles; a curved portion 28, adapted to take between projections 29 on bracket 22; an angular portion 30, adapted to take through the agitator-handle 18, and a straight lower end 31, adapted to take against the door 5. By passing the arm of an ordinary padlock through apertures 32 in projections 29 and through an aperture in the lock-bar 24 the minor receptacles are locked to the major one and the individual compartments are locked against access.

I claim as my invention—

1. In a kitchen-cabinet the combination of a major receptacle having an upper and lower opening each provided with a removable lid or cover; a removable sieve within the receptacle between the openings; an agitator within the sieve; an agitator-handle connected therewith and extending through the wall of the receptacle; a series of minor receptacles arranged about and supported by the major, and a locking-bar adapted to lock the lids in closed position, the agitator-handle against movement, and the minor receptacles to the major, substantially as and for the purpose set forth.

2. In a kitchen-cabinet a receptacle for flour &c. provided with a removable sieve consisting of an annular guide-rim, 7, and a screen-bottom, 8; V-shaped grooves in the annular portion and flanged wedges, 21, adapted to take into the grooves and expand the guide-rim against the inner periphery of the receptacle, substantially as and for the purpose set forth.

MILLARD F. BROWN.

Witnesses:
E. K. HOOD,
NATHAN R. PARK.